A. MUTSCHELLER.
PRESSURE REGULATOR FOR VACUUM TUBES.
APPLICATION FILED NOV. 4, 1918.
1,409,460.
Patented Mar. 14, 1922.
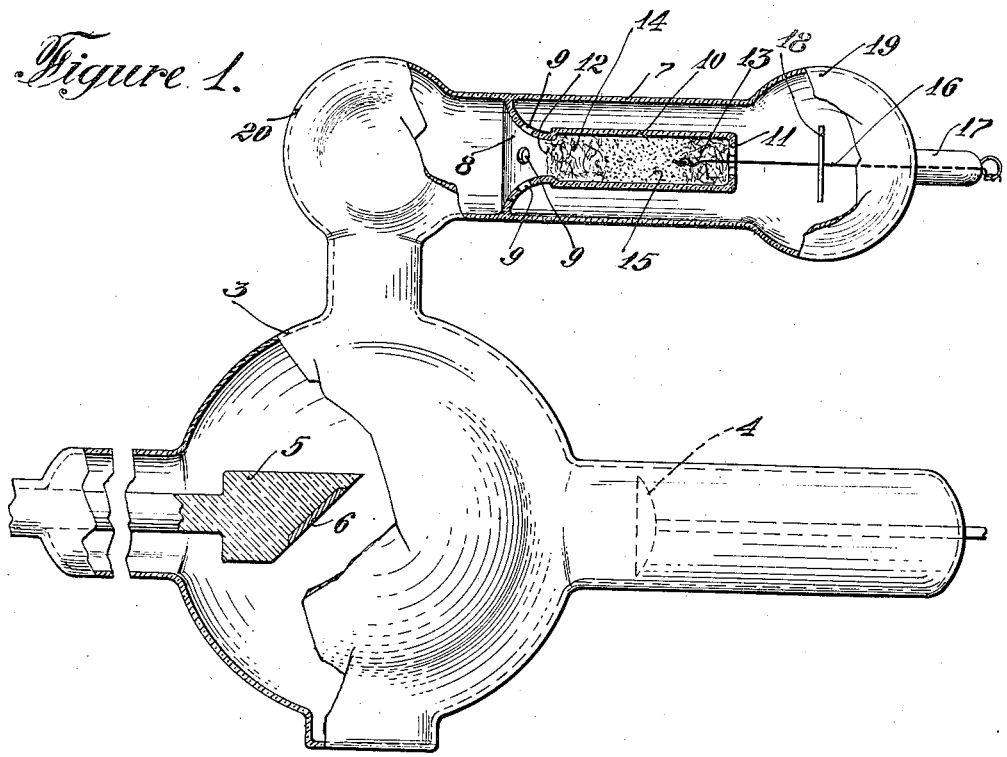
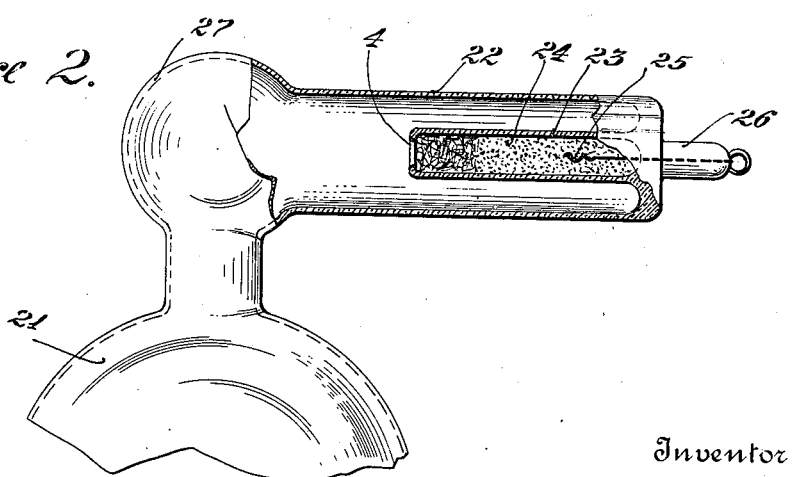
Inventor
Arthur Mutscheller
By his Attorney
Walton Harrison.

UNITED STATES PATENT OFFICE.

ARTHUR MUTSCHELLER, OF NEW YORK, N. Y., ASSIGNOR TO WAPPLER ELECTRIC COMPANY, INC., A CORPORATION OF NEW YORK.

PRESSURE REGULATOR FOR VACUUM TUBES.

1,409,460.        Specification of Letters Patent.      Patented Mar. 14, 1922.

Application filed November 4, 1918. Serial No. 261,154.

*To all whom it may concern:*

Be it known that I, ARTHUR MUTSCHELLER, a citizen of the United States, residing in the city of New York, in the county and State of New York, have invented certain new and useful Improvements in Pressure Regulators for Vacuum Tubes, of which the following is a full, clear, and exact description.

My invention relates to regulation of the gas pressure in vacuum tubes of various kinds, in order to control the degree of attenuation of the gas.

More particularly stated, my invention is adapted for use in X-ray tubes and other vacuum tubes of the type in which regulation of the gas pressure is under control by means of a substance which under normal conditions will slowly absorb portions of the gas, but which under special conditions, controllable at the will of the operator, will give off the gas rapidly.

Among the objects I seek to accomplish by my invention are the following:

I. To use in the tube a gas which is comparatively inert, and to provide as a regulating material a substance normally capable of absorbing this gas notwithstanding its inertness, yet adapted to liberate it freely when the substance is heated.

II. To employ as a regulating material a substance capable of absorbing both an inert gas and a more active gas, and yet acting selectively so that said substance when heated to moderately high temperatures will give off the inert gas without releasing the more active gas, but when heated to considerably higher temperatures may also give off the more active gas.

III. To prevent undue increase in the gas pressure of the tube in the event of exposure of the regulating material to excessive action of the heating current and rendering the vacuum tube self-regulating to a certain extent, by providing the tube with an auxiliary discharge path to which the heating current is diverted from the regulating material whenever the increase in pressure of the attenuated gas within the tube exceeds a predetermined limit and as a consequence the resistance of the auxiliary discharge path is reduced accordingly.

IV. To use the auxiliary discharge as a means for automatically protecting the regulating material from damage due to exposure to excess of current used for heating the regulating material.

V. To facilitate removal of any active gases present along with the inert gas during the exhaustion of the vacuum tube, by heating the regulating material, the electrodes, and the body portion of the vacuum tube in order to liberate the gases they may hold by absorption.

VI. To provide a vacuum tube containing rarefied nitrogen, and to maintain a maximum of purity for this nitrogen under all normal conditions, by preventing the contamination of the nitrogen by traces of more active gases which may unavoidably be present within the tube.

VII. To protect the vacuum tube, and particularly the portion thereof used as a housing for the regulating material, from damage arising from the action of excessive current upon the regulating material.

VIII. To avoid the necessity for subjecting the vacuum tube to the process known in this art as "seasoning," and thus to enable the tube to develop its full efficiency at the commencement of its use.

My invention is based in part upon my discovery that various metallic nitrides, among them being those of thorium, aluminum and barium, have the remarkable property of acting selectively as between a number of different gases forming a mixture, for the purpose of absorbing the gases and of releasing them after absorption. Thus in the event of the nitride being exposed to a mixture of oxygen and nitrogen, the nitride tends to absorb all of the oxygen before absorbing any nitrogen, and if heated tends to release all the nitrogen it may hold, before releasing any oxygen.

While it is impracticable to disclose all forms of my invention, or even to enumerate the various uses to which it may be applied, I will show and describe two forms which may be considered as typical.

Reference is made to the accompanying drawing forming a part of this specification, and in which like letters indicate like parts in the respective figures.

Figure 1 is a view, partly in side elevation and partly broken away, of an X-ray tube equipped with one form of my invention.

Figure 2 is a view, partly in side elevation and partly broken away, of an X-ray tube provided with a form of my invention differing from that shown in Figure 1.

Referring more particularly to Figure 1, the X-ray bulb 3 carries a cathode 4 and an anode 5, the anode having a tungsten or platinum facing 6 and serving as the target.

The X-ray bulb 3 is provided with a limb 7 of tubular form, the interior passage of which communicates with the interior passage of the member 3. The limb 7 is provided with a partition 8, having a number of holes 9 through it.

Located within the limb 7 and preferably concentric thereto as shown is a small cylinder 10. This cylinder is made of glass, porcelain or other appropriate material and is integral with the limb 7. It is provided at its ends with openings 11, 12, so shaped as to enable the tube to retain packings 13, 14 of asbestos fiber or glass wool. Located between the packings 13, 14 and held in position thereby, is a mass 15 of regulating material, in the form of a powder.

A wire 16 is connected with a terminal cap 17 of metal, and extends into the cylinder 10 and into the mass 15 of regulating material, so as to make good contact therewith.

Mounted upon the wire 16 is a disk 18 of aluminum, serving as an auxiliary discharge terminal. This disk is located within an enlarged rounded portion 19 of the limb 7.

The purpose of the regulating material is to control the gas pressure within the vacuum tube, which it does by the absorption and liberation of portions of the rarefied gas or gases present.

I preferably use nitrogen as the rarefied gas filling the tube, and a nitride of thorium, aluminum or barium, or a mixture of these nitrides, as the regulating material.

The cylinder 10 with parts carried thereby is conveniently designated as a regulating chamber.

The vapor pressure or dissociation pressure of the regulating material should be lower than the gas pressure within the tube.

The limb 7 is provided with a bulbous portion 20—that is, a portion having approximately a spherical form and with a diameter somewhat greater than the general cross diameter of the limb. The purpose of the enlarged or bulbous portion 20 is to protect the limb from the destructive effects of the auxiliary discharge, as hereinafter more completely explained.

The disk 18 is so proportioned that the auxiliary discharge is not too intense, and yet is adequate for the purpose contemplated.

In the form shown in Figure 2 the structure is somewhat simpler. The X-ray bulb appears at 21, the limb 22 being supported thereby and communicating therewith. Housed within this limb and extending inwardly from the end portion thereof is a cylinder 23, containing regulating material 24. A wire 25 extends from a terminal cap 26 directly into this material. The limb 22 is provided with an enlarged portion 27, having approximately a spherical form.

In the use of either form of my invention, the rarefied gas is introduced into the tube in the manner indicated below.

The tube is first brought into communication with a supply of nitrogen, and the air in the tube is driven out by displacement. For this purpose a pump is preferably employed. If desired, the tube may be alternately exhausted and refilled with nitrogen. As the specific gravity of nitrogen is only .972 as compared with unity for air, the displacement should be downward—that is, nitrogen admitted into the tube from above, and the air removed from below. Next the tube as a whole, including the regulating material, is heated, preferably in an oven. This heating causes the regulating material to liberate any gases it may hold by absorption, and also causes the disengagement of any gases previously held by occlusion, absorption or capillarity upon the electrodes and parts adjacent thereto, as well as upon the inner surfaces of the tube and limb.

The gases thus liberated are immediately diffused throughout the general body of free nitrogen contained within the tube and limb.

The heating should be to a temperature sufficiently high to liberate, as thoroughly as possible, any traces of oxygen or other gases having great chemical activity.

This done, the tube should be exhausted. The quantity of gas left in the tube should be such that under normal working conditions of the tube the excess of free gas, over and above the quantity held by absorption in the regulating material at its normal temperature, is just right for the production of hard X-rays. In other words, when the tube is in action and working under normal conditions, the regulating material should neither absorb more gas nor liberate any gas it already holds, and consequently the general gas pressure within the tube should tend to remain substantially constant.

It is not practicable, however, to attain ideal conditions in this relation. At best, a trace of oxygen will nearly always remain in the tube, and a prominent object of my invention is to take care of this oxygen and prevent it from attacking the electrodes and otherwise doing harm under the stimulus of the electrical currents employed.

Since the regulating material absorbs oxygen more readily than it does nitrogen, and gives off nitrogen more readily than it does oxygen, it follows that under normal conditions of service and with the regulating material not heated, all of the oxygen within the tube is held by absorption within the regulating material. Hence, when the regulating material is heated to a moderately high temperature, nitrogen is given off by the regulating material, but the oxygen is still held. It is only when the regulating material is heated to excessively high temperatures that any portion of the oxygen is liberated by the regulating material, and temperatures high enough for this purpose need never obtain in practice.

Thus under all practical conditions of service nitrogen, and nitrogen alone, is the only free gas within the tube; the oxygen, if any be present, being bound and thus rendered harmless. If, owing to any accidental cause, as for instance by some anomalous action of the electric current, a trace of oxygen or of any other active gas or vapor should be liberated, it is forthwith absorbed and afterward remains bound.

The regulating material, being made up of one or more nitrides, has a positive temperature coefficient of resistance. That is to say, heating the regulating material increases its resistance to the passage of electricity through it.

Since, however, heating the regulating material causes it to disengage a portion of its nitrogen and thus to increase the general gas pressure within the vacuum tube, and since within the limitations here contemplated such slight increase in the gas pressure diminishes the resistance of the attenuated gas, it follows that the gas pressure reaches a critical point at which the gas becomes a better conductor than the regulating material.

Thus an electric discharge is set up from the disk 18, extending around the outside of the regulating chamber, through the holes 9 and bulbous portion 20, thence downwardly to one of the electrodes.

This discharge I designate as the auxiliary discharge. It prevents overheating of the regulating material, and by so doing prevents undue increase of the gas pressure within the tube. Not only this, but it prevents the liberation of the more active gases if any be held by the regulating material. Last but not least, to a certain extent it renders the X-ray tube self-regulating, because if the regulating material be subjected to the action of the heating current, and the current is not switched off by hand at the proper moment, the current is automatically shifted from the regulating material as soon as the gas pressure in the tube attains a predetermined maximum.

If the gas pressure is normal for practical working conditions, the electric current does not pass through the regulating material.
The purpose of the enlarged or bulbous portion 20 of the tube is to prevent the auxiliary discharge from cracking the tube or otherwise injuring it. The heat due to the discharge is distributed by the form of the member 20, and the danger mentioned is thus prevented. I find it desirable that in practice the bulbous portion 20 may have a diameter of approximately an inch and a half, which is adequate for the purpose.

The precise manner in which gases are held by absorption in the relation above contemplated is a matter upon which opinions may well differ. According to our present knowledge, absorption may be of two kinds, one being due to chemical affinity and the other being purely physical and closely associated with capillarity. It is probable that under the complex conditions obtained in an X-ray tube the absorption of gas is partly of chemical origin and partly due to physical causes. Hence, I use the term absorption in a very broad sense, including occlusion.

The operation of my device may be readily understood in the light of the foregoing description.

The parts being assembled and the tube being exhausted, it is ready for service.

Whenever the gas pressure within the tube becomes too low, the operator merely switches an electric current through the regulating chamber. Ordinarily he turns this current off as soon as the regulating material is heated and gives off a supply of gas adequate to correct the gas pressure within the tube. If, however, the operator fails to turn off the heating current at the proper instant, no damage can ensue, because at the critical moment the auxiliary discharge above described is set up and further heating of the regulating material is thus prevented automatically.

I do not limit myself to the precise mechanism shown, as variations may be made therein without departing from the spirit of my invention. Nor do I limit myself to use of my invention in connection with X-ray tubes, as it is well adapted for vacuum tubes of other kinds in which the gas pressure needs to be regulated.

I claim:—

1. In a vacuum tube the combination, with discharge terminals and a bulb enclosing said discharge terminals and containing a body of nitrogen highly rarefied, of a regulating material exposed to said body of nitrogen for the purpose of regulating the pressure thereof, and means controllable partly by the resistance of said regulating material and partly by the resistance of said body of nitrogen, for the purpose of diverting the flow of current from the regulating material and into an auxiliary discharge path through said body of nitrogen.

2. In a device of the character described the combination of a tube provided with a limb, said tube and said limb containing a continuous body of gas highly rarefied, regulating material disposed within said limb and controllable by high tension currents for the purpose of increasing the pressure of said rarefied gas, electric connections for directing said currents into said regulating material, and means controllable in part by a change in the resistance of said gas for the purpose of causing said currents to set up an auxiliary discharge through the portion of the rarefied gas occupying said limb.

3. In a vacuum tube the combination, with a bulb and discharge terminals enclosed by said bulb, of a body of nitrogen filling said bulb and enveloping said discharge terminals, and a regulating material containing a nitride and controllable by changes in temperature for the purpose of absorbing and liberating portions of said body of nitrogen.

4. In a vacuum tube the combination, with an enclosing member and a body of rarefied nitrogen filling said member, of a nitride exposed to said body of rarefied nitrogen for the purpose of regulating the pressure thereof.

5. In an X-ray tube the combination, with a bulb and a pair of electrodes located therein, of a regulating chamber communicating with said bulb, a nitride housed within said regulating chamber and means controllable at the will of the operator for heating said nitride.

6. In an X-ray tube the combination, with a bulb and discharge terminals located within said bulb, of a regulating chamber communicating with said bulb, a body of nitrogen filling said bulb and extending into said regulating chamber, a nitride housed within said regulating chamber, and means controllable at the will of the operator for subjecting said nitride to the action of an electric current in order to heat said nitride.

7. In a vacuum tube the combination of a bulb provided with a limb, a body of rarefied gas filling said bulb and said limb, a regulating material disposed within said limb and controllable by an electric current for liberating a gas in order to raise the pressure of said body of gas, electric connections for facilitating the passage of said current through said regulating material, and means controllable partly by the resistance of said regulating material and partly by the resistance of said body of gas, for diverting the flow of current from the regulating material and into an auxiliary discharge path located within said limb.

8. In a vacuum tube the combination, with a hollow receptacle and a body of inert rarefied gas filling the same and unavoidably containing a trace of a more chemically active gas, of a regulating material disposed within said receptacle and in contact with said gas, said regulating material having the property of absorbing said inert gas, and also of more readily absorbing said more chemically active gas.

9. In a vacuum tube the combination of a hollow receptacle, a body of inert rarefied gas filling said receptacle, and a regulating material disposed within said receptacle for the purpose of regulating the pressure of said gas, said regulating material having the property of readily absorbing a chemically active gas and holding it tenaciously, and also having the property of less readily absorbing the inert gas, and of holding the same less tenaciously than the chemically active gas.

10. In a device of the character described the combination of a tube provided with a limb having an enlarged portion, said tube and said limb containing a continuous body of rarefied gas, regulating material disposed within said limb and controllable by high tension currents for the purpose of increasing the pressure of said rarefied gas within said tube, electric connections for directing said currents into said regulating material, and means controllable in part by a change in the resistance of said rarefied gas for the purpose of causing said high tension currents to set up an auxiliary discharge directly through the rarefied gas occupying said limb, the enlarged portion of said limb serving to distribute the heat of said discharge and thus protecting the limb from the destructive effects of said discharge.

ARTHUR MUTSCHELLER.